US012756498B1

(12) United States Patent
Razavi Majomard et al.

(10) Patent No.: US 12,756,498 B1
(45) Date of Patent: Oct. 6, 2026

(54) ETHERNET PHY DEVICE WITH ENHANCED EMI SUPPRESSION USING ADAPTIVE SLICER

(71) Applicant: Marvell Asia Pte Ltd, Singapore (SG)

(72) Inventors: Seid Alireza Razavi Majomard, Belmont, CA (US); David Shen, Saratoga, CA (US)

(73) Assignee: Infineon Technologies Americas Corp., El Segundo, CA (US)

(*) Notice: Subject to any disclaimer, the term of this patent is extended or adjusted under 35 U.S.C. 154(b) by 543 days.

(21) Appl. No.: 18/321,011

(22) Filed: May 22, 2023

Related U.S. Application Data

(60) Provisional application No. 63/345,066, filed on May 24, 2022.

(51) Int. Cl.
*H04L 1/00* (2006.01)
*H04B 17/345* (2015.01)
*H04L 67/12* (2022.01)

(52) U.S. Cl.
CPC ......... *H04L 1/0048* (2013.01); *H04B 17/345* (2015.01); *H04L 67/12* (2013.01)

(58) Field of Classification Search
CPC ...................................................... H04L 1/0048
See application file for complete search history.

(56) References Cited

U.S. PATENT DOCUMENTS 7,693,240 B2 * 4/2010 Mezer ...................... H04B 3/32 375/229
9,716,529 B1 * 7/2017 Dai ................... H04L 25/03885
10,651,956 B2 * 5/2020 Hisch ................... H04N 1/2125
11,038,599 B1 * 6/2021 Oveis Gharan .... H04B 10/6165
2008/0200138 A1 * 8/2008 Sipila .................. H04B 1/7115 370/252
2011/0310936 A1 * 12/2011 Malkin .................. H04B 15/00 375/219
2012/0002711 A1 * 1/2012 Kota ....................... H04L 27/01 375/232

(Continued)

OTHER PUBLICATIONS

IEEE Std. 802.3ch-2020, "IEEE Standard for Ethernet—Amendment 8: Physical Layer Specifications and Management Parameters for 2.5 Gb/s, 5 Gb/s, and 10 Gb/s Automotive Electrical Ethernet," IEEE Computer Society, pp. 1-207, year 2020.

(Continued)

*Primary Examiner* — Guang W Li

(74) *Attorney, Agent, or Firm* — Meitar Patents Ltd.; Daniel Kligler

(57) ABSTRACT

An Ethernet Physical Layer (PHY) device for use in an Ethernet communication system includes a receiver, an Electromagnetic Interference (EMI) detector and a slicer controller. The receiver is configured to receive an Ethernet signal from a physical Ethernet link. The receiver includes a slicer configured to convert the received signal into a sequence of demodulated symbols by comparing samples of the signal to one or more decision thresholds. The EMI detector is configured to detect EMI that distorts the received signal. The slicer controller is configured to adjust at least a decision threshold among the one or more decision thresholds of the slicer, relative to the samples of the signal, responsively to the detected EMI.

23 Claims, 3 Drawing Sheets

(56) References Cited

U.S. PATENT DOCUMENTS

| | | | | |
|---|---|---|---|---|
| 2012/0128048 | A1* | 5/2012 | Dabiri | H04B 3/46 375/224 |
| 2012/0128049 | A1* | 5/2012 | Dabiri | H04B 17/26 375/346 |
| 2012/0201286 | A1* | 8/2012 | Pons | H04B 17/345 375/227 |
| 2019/0188997 | A1* | 6/2019 | Gilson | G08B 29/18 |
| 2022/0231726 | A1* | 7/2022 | Lo | H04B 1/30 |
| 2024/0103537 | A1* | 3/2024 | Lee | G06T 7/0002 |
| 2024/0178850 | A1* | 5/2024 | Kiesel | H03M 1/007 |

OTHER PUBLICATIONS

IEEE Std. P802.3cy/D3.2, "Draft Standard for Ethernet—Amendment 8: Physical Layer Specifications and Management Parameters for 25 Gb/s Electrical Automotive Ethernet," IEEE Computer Society, pp. 1-141, Mar. 23, 2023.

* cited by examiner

ETHERNET PHY DEVICE WITH ENHANCED EMI SUPPRESSION USING ADAPTIVE SLICER

CROSS-REFERENCE TO RELATED APPLICATIONS

This application claims the benefit of U.S. Provisional Patent Application 63/345,066, filed May 24, 2022, whose disclosure is incorporated herein by reference.

FIELD OF THE DISCLOSURE

The present disclosure relates generally to data communication networks, and particularly to methods and systems for suppressing Electromagnetic Interference (EMI) in network devices.

BACKGROUND

Ethernet networks are sometimes required to operate in environments characterized by strong Electromagnetic Interference (EMI). An automotive Ethernet network installed in a vehicle, for example, may be subject to EMI from adjacent systems in the vehicle, from radio broadcast towers nearby the vehicle, and the like. Industrial Ethernet networks, too, may be subject to EMI originating from nearby electronic or electromechanical equipment. In some applications, resilience against EMI is crucial. In an autonomous vehicle, for example, performance degradation due to EMI may have serious implications on driver safety.

The description above is presented as a general overview of related art in this field and should not be construed as an admission that any of the information it contains constitutes prior art against the present patent application.

SUMMARY

An embodiment that is described herein provides an Ethernet Physical Layer (PHY) device for use in an Ethernet communication system. The Ethernet PHY device includes a receiver, an Electromagnetic Interference (EMI) detector and a slicer controller. The receiver is configured to receive an Ethernet signal from a physical Ethernet link. The receiver includes a slicer configured to convert the received signal into a sequence of demodulated symbols by comparing samples of the signal to one or more decision thresholds. The EMI detector is configured to detect EMI that distorts the received signal. The slicer controller is configured to adjust at least a decision threshold among the one or more decision thresholds of the slicer, relative to the samples of the signal, responsively to the detected EMI.

In disclosed embodiments, the slicer controller is configured to adjust the decision thresholds relative to the samples of the signal by performing one or both of (i) moving the decision threshold, and (ii) moving amplitudes of at least some of the samples of the signal. In an embodiment, the EMI detector is configured to detect the EMI by detecting signal-dependent EMI that causes a noise distribution of the received signal to have (i) a first variance when calculated over a first subset of the samples associated with a first modulation level, and (ii) a second variance, different from the first variance, calculated over a second subset of the samples associated with a second modulation level, different from the first modulation level.

In an example embodiment, the EMI detector is configured to detect the EMI by detecting a common-mode component of the received signal. In another embodiment, the EMI detector is configured to detect the EMI by detecting a deviation from an expected relationship between error rate and Signal-to-Noise Ratio (SNR) in the received signal.

In a disclosed embodiment, the slicer controller is configured to adjust the decision threshold using a criterion that aims to reduce an error rate in the sequence of demodulated symbols. In another embodiment, the received signal carries data encoded with a Forward Error Correction (FEC) code, the Ethernet PHY device further includes a FEC decoder configured to decode the FEC code, and the slicer controller is configured to adjust the decision threshold using a criterion that aims to reduce, at an output of the FEC decoder, at least a rate of errors that are correctable. In yet another embodiment, the slicer controller is configured to adjust the decision threshold using a criterion that aims to reduce, at an output of the FEC decoder, at least a rate of errors that are uncorrectable.

In some embodiments, the slicer controller is configured to estimate first and second noise metrics over respective first and second subsets of the samples associated with respective first and second modulation levels of the received signal, and to adjust the decision threshold based on the first and second noise metrics. In an example embodiment, the slicer controller is configured to (i) average the first and second noise metrics over a first averaging window when the EMI is not detected, and (ii) when the EMI is detected, average the first and second noise metrics over a second averaging window, shorter than the first averaging window.

In a disclosed embodiment, the slicer controller is configured to permit adaptation of the decision threshold when the EMI is detected, and to freeze the decision threshold when the EMI is not detected.

There is additionally provided, in accordance with an embodiment that is described herein, a method in an Ethernet Physical Layer (PHY) device of an Ethernet communication system. The method includes receiving an Ethernet signal from a physical Ethernet link, and converting the received signal into a sequence of demodulated symbols by comparing samples of the signal to one or more decision thresholds. Electromagnetic Interference (EMI) that distorts the received signal is detected. At least a decision threshold among the one or more decision thresholds is adjusted, relative to the samples of the signal, responsively to the detected EMI.

The present disclosure will be more fully understood from the following detailed description of the embodiments thereof, taken together with the drawings in which:

DETAILED DESCRIPTION OF EMBODIMENTS

Figure 1:
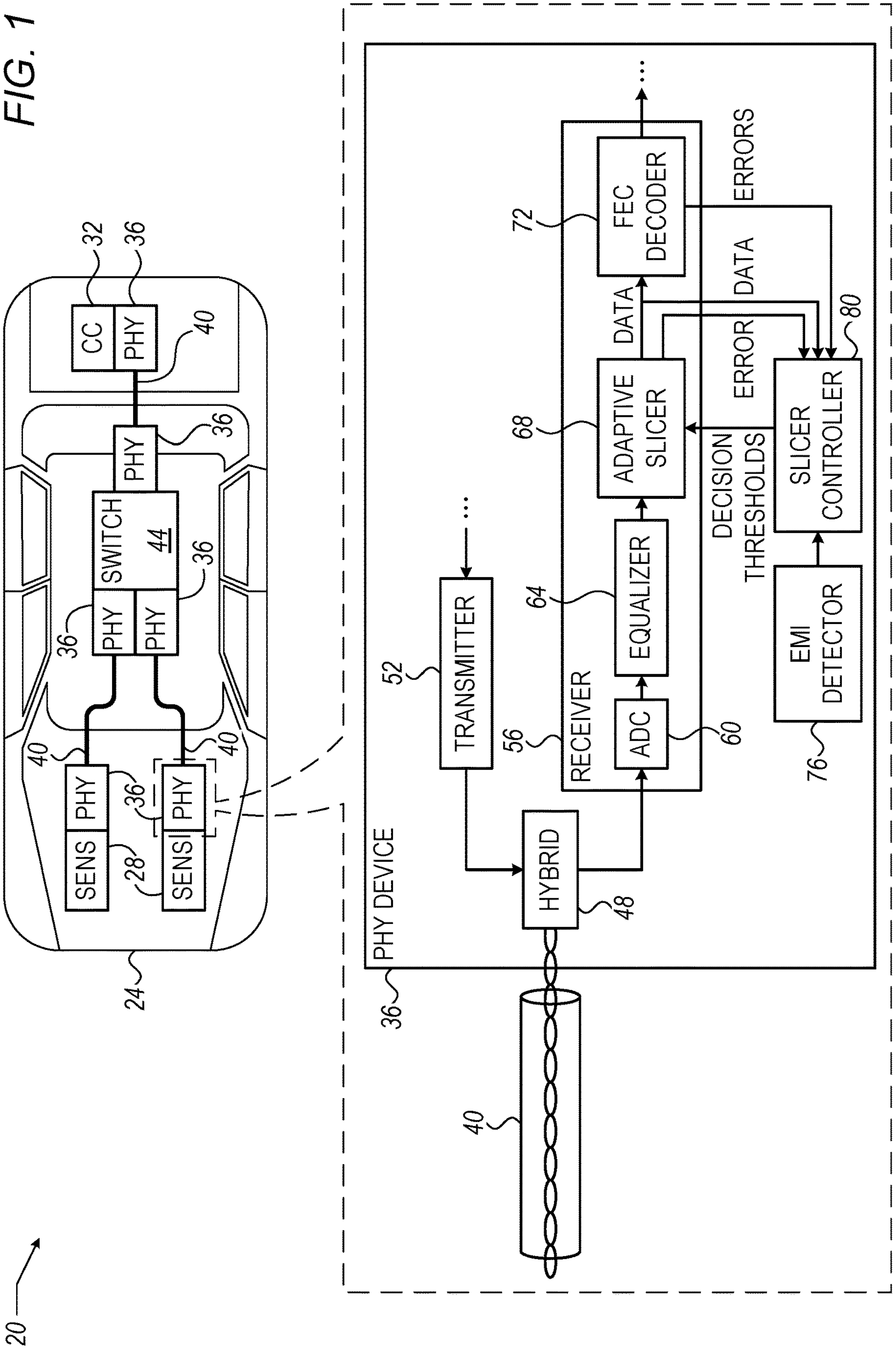
FIG. 1 is a block diagram that schematically illustrates an automotive Ethernet communication system that uses adaptive slicers for EMI suppression, in accordance with an embodiment that is described herein.

An Ethernet communication link typically comprises, among other components, a pair of Physical Layer (PHY)

devices that communicate with one another over a physical link. The transmitter of an Ethernet PHY device typically modulates data to produce an Ethernet signal for transmission, using a modulation scheme having two or more modulation levels. Two common modulation schemes addressed herein are two-level Pulse Amplitude Modulation (PAM2) having two modulation levels, and four-level PAM (PAM4) having four modulation levels. The disclosed techniques are useful, however, with any other suitable modulation scheme having any other number of modulation levels.

The receiver of an Ethernet PHY device may comprise a slicer circuit (referred to as "slicer" for brevity) that demodulates a received Ethernet signal by comparing digitized samples of the signal to one or more decision thresholds. In PAM2 (sometimes referred to as Non-Return to Zero—NRZ), for example, the slicer uses a single decision threshold positioned between the two modulation levels. In PAM4 the slicer uses three decision thresholds, each positioned between two adjacent modulation levels.

In various practical scenarios, a received Ethernet signal may be distorted by EMI. In some cases the EMI is signal dependent. The embodiments described herein are explained mainly in the context of signal-dependent EMI. The disclosed techniques, however, are applicable to both signal-dependent and non-signal-dependent EMI.

In the context of the present disclosure and in the claims, the term "signal-dependent EMI" refers to EMI-induced distortion having characteristics (e.g., average power or other noise metric) that differ between at least two modulation levels. In other words, for at least two modulation levels, signal-dependent EMI has a lesser impact on signal samples associated with one modulation level, and a stronger impact on signal samples associated with the other modulation level. In one example scenario, the samples associated with one modulation level have a noise distribution having a certain average noise power, while the samples associated with another modulation level have a noise distribution having a different average noise power.

Signal-dependent EMI is a non-linear impairment that is challenging to mitigate using conventional mechanisms such as fast retraining, notch filtering, adaptive equalization or adaptive colored-noise cancellation. In some cases, signal-dependent EMI may differ in characteristics from one PHY device to another. Additionally or alternatively, the characteristics of signal-dependent EMI may vary over time in a given PHY device.

Embodiments that are described herein provide techniques that reduce the impact of EMI by adapting one or more of the decision thresholds of the slicer. The disclosed techniques, when applied to signal-dependent EMI, are based on the observation that, since the characteristics of signal-dependent EMI are not the same for all modulation levels, the optimal positions of the decision thresholds are not necessarily the mid-points between adjacent modulation levels. Moreover, since the characteristics of signal-dependent EMI may vary from one PHY device to another and/or over time, the optimal decision thresholds of the slicer should typically vary in a similar manner.

In some embodiments, a disclosed PHY device comprises a slicer, an EMI detector, and a slicer controller. The EMI detector is configured to detect EMI that distorts the received signal. The slicer controller is configured to adaptively set the decision thresholds of the slicer relative to the received signal, based on the detected EMI. Setting the decision thresholds based on actual detected EMI, as opposed to fixing the decision thresholds at the mid-points between modulation levels, improves the performance of the slicer significantly, particularly in scenarios characterized by signal-dependent EMI.

In various embodiments, the slicer controller may adjust a decision threshold relative to the received signal in various ways. In some embodiments, the slicer controller adjusts the decision threshold while keeping the amplitudes of the signal samples fixed. In other embodiments, the slicer controller may adjust the amplitudes of at least some of the signal samples using a suitable mapping (typically a non-linear mapping) while keeping the decision threshold fixed. The two kinds of adaptation are equivalent in terms of performance—Both resulting in adaptation of the distance between the decision threshold and the signal samples. Combined solutions, which modify both the decision threshold and the signal samples, are also possible.

In various embodiments, the slicer controller may use various criteria for adapting the decision thresholds. In one example, the slicer controller aims to minimize the error rate, e.g., Bit Error Rate (BER) or Frame Error Rate (FER), at the slicer output. In another example, the received signal is encoded with a Forward Error Correction (FEC) code, the PHY device further comprises a FEC decoder that decodes the FEC code, and the slicer controller aims to minimize the rate of correctable errors and/or the rate of uncorrectable errors achieved by the FEC decoder.

In some embodiments, the slicer controller sets a given decision threshold by (i) calculating noise metrics (e.g., average noise power or noise variance) for the two modulation levels separated by the decision threshold, and (ii) setting the decision threshold based on the noise metrics.

In some embodiments, the slicer controller configures the adaptation process depending on whether signal-dependent EMI is currently present in the received signal or not. In an example embodiment, the slicer controller permits adaptation when signal-dependent EMI is present, and freezes the adaptation otherwise. In another example embodiment, the slicer controller adapts the decision thresholds continuously, but uses a shorter averaging window when signal-dependent EMI is present.

In some embodiments, the slicer controller sets the decision thresholds to fixed values, but values which are not precisely at the mid-points between adjacent modulation levels. This technique is useful, for example, for mitigating signal-dependent EMI that exhibits little or no variation over time.

Various implementation examples of the disclosed techniques are described below. The example embodiments disclosed herein are described in the context of an automotive Ethernet network. The disclosed techniques, however, are generally applicable in various other environments and network types.

FIG. 1 is a block diagram that schematically illustrates an automotive Ethernet communication system 20 that uses adaptive slicers for EMI suppression, in accordance with an embodiment that is described herein. In the embodiment described, system 20 is installed in a vehicle 24, and comprises multiple sensors 28 that communicate with a central computer (CC) 32. In other embodiments (not seen), system 20 may be installed in an industrial network or other suitable network. In various embodiments, sensors 28 may comprise any suitable types of sensors. Several non-limiting examples of sensors comprise video cameras, velocity sensors, accelerometers, audio sensors, infra-red sensors, radar sensors, lidar sensors, ultrasonic sensors, rangefinders or other proximity sensors, and the like.

Sensors 28 and CC 32 communicate via an Ethernet network comprising multiple Ethernet PHY transceivers 36 (also referred to as PHY devices), multiple network links 40 and an Ethernet switch 44. Elements such as Medium Access Control (MAC) devices are not shown in the figure for the sake of clarity. In the present example, PHY transceiver 36 of each sensor 28 is connected by a network link 40 to a peer PHY transceiver 36 coupled to a port of switch 44. CC 32 is also connected to a port of switch 44 in a similar manner, via a network link 40 and a pair of PHY transceivers 36. Ethernet links 40 are full-duplex links, e.g., twisted-pair cables.

In various embodiments, PHY transceivers 36 of system 20 may communicate over network links 40 at any suitable bit rate. Example bit rates are 2.5 Gb/s, 5 Gb/s or 10 Gb/s in accordance with the IEEE 802.3ch-2020 standard, and 25 Gb/s in accordance with the IEEE 802.3cy standard.

An inset at the bottom of FIG. 1 focuses on one of PHY devices 36, which communicate over a twisted-pair link 40, by way of example. The other PHY devices 36 typically have a similar internal structure.

In the present example, PHY device 36 comprises a hybrid combiner 48 that serves as a bidirectional interface to cable 40. PHY device 36 further comprises a transmitter 52 and a receiver 56. Since the disclosed techniques relate to signal reception, transmitter 52 is not described in detail. In an embodiment, receiver 56 comprises an Analog-to-Digital Converter (ADC) 60, an equalizer 64, an adaptive slicer 68 and a FEC decoder 72.

Receiver 56 receives an analog Ethernet signal from the peer PHY device, on cable 40 via hybrid 48. The received signal is modulated, e.g., using PAM2 or PAM4 modulation. The data carried by the signal is encoded with a suitable FEC code. ADC 60 digitizes the analog signal, i.e., converts the analog signal into a digital signal comprising a sequence of digital samples. Equalizer 64 filters the digital signal so as to compensate for the channel response of cable 40.

Slicer 68 demodulates the digital signal so as to output a sequence of demodulated symbols (also referred to simply as "data"). To produce the demodulated symbols, slicer 68 compares the samples of the received signal to one or more decision thresholds. FEC decoder 72 decodes the FEC code so as to produce decoded data. The decoded data is delivered to an upper layer, e.g., to a MAC processor (not seen in the figure).

In an embodiment, one or more of the decision thresholds of slicer 68 (typically all the decision thresholds) are variable. PHY device 36 further comprises an EMI detector 76 and a slicer controller 80. EMI detector 76 is configured to detect EMI in the received Ethernet signal. Slicer controller 80 is configured to set one or more of the decision thresholds of slicer 68 (typically all the decision thresholds) adaptively based on the detected EMI. Example techniques for adapting the decision thresholds are described in detail below. As noted above, the embodiments described herein refer mainly to signal-dependent EMI by way of non-limiting example.

The configurations of system 20 and of PHY device 36, as shown in FIG. 1, are example configurations that are depicted solely for the sake of clarity. In alternative embodiments, any other suitable configurations can be used. For example, in some embodiments slicer controller 80 is configured to set the decision thresholds of slicer 68 to fixed values, with at least one of the values differing from the mid-point between the two corresponding modulation levels.

The different elements of PHY device 36 may be implemented using dedicated hardware or firmware, such as using hard-wired or programmable logic, e.g., in an Application-Specific Integrated Circuit (ASIC) or Field-Programmable Gate Array (FPGA). Additionally, or alternatively, some functions of PHY device 36 may be implemented in software and/or using a combination of hardware and software elements. Elements that are not mandatory for understanding of the disclosed techniques have been omitted from the figure for the sake of clarity.

In some embodiments, some functions of the disclosed PHY devices, e.g., functions of slicer controller 80 and/or of EMI detector 76, may be implemented in one or more programmable processors, e.g., one or more Central Processing Units (CPUs), microcontroller and/or Digital Signal Processors (DSPs), which are programmed in software to carry out the functions described herein. The software may be downloaded to any of the processors in electronic form, over a network, for example, or it may, alternatively or additionally, be provided and/or stored on non-transitory tangible media, such as magnetic, optical, or electronic memory.

Figure 2A:
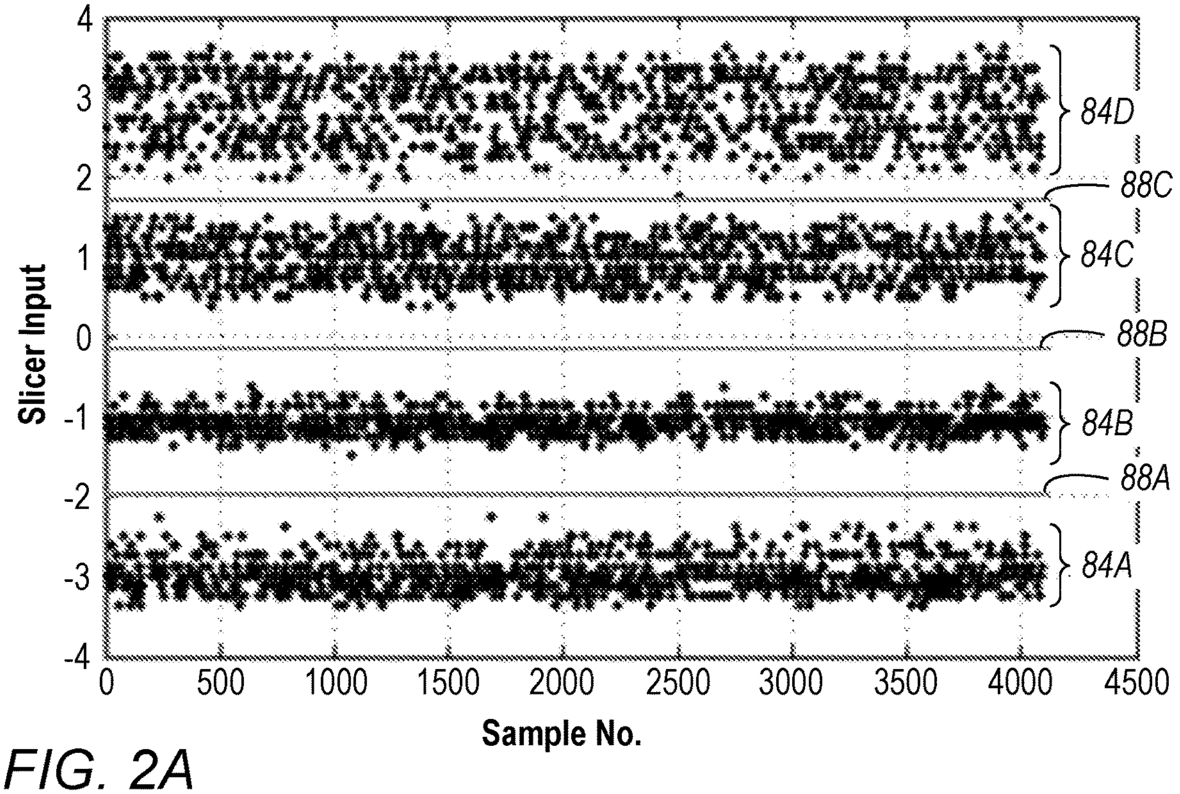
FIGS. 2A and 2B are graphs that schematically illustrate adaptive slicer decision thresholds used for demodulating a received Ethernet signal in the system of FIG. 1, in accordance with embodiments that are described herein.
Figure 2B:
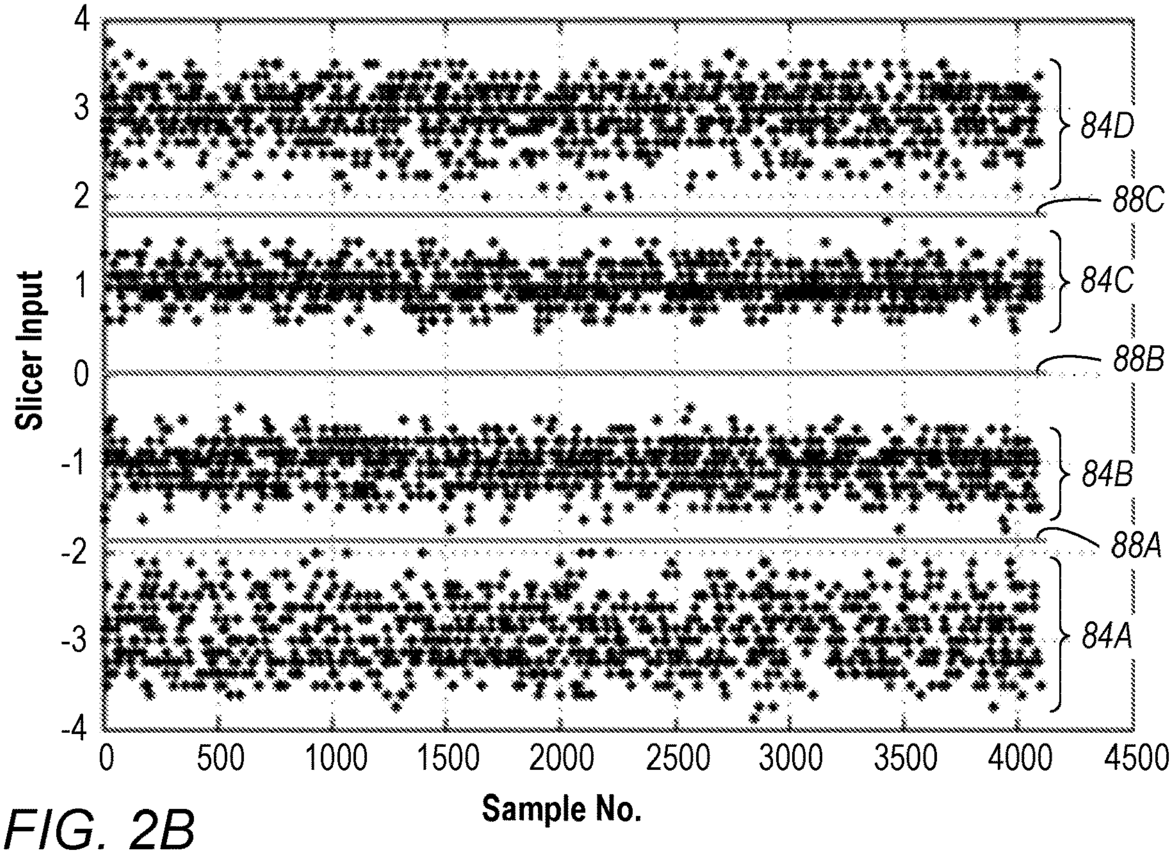

FIGS. 2A and 2B are graphs that schematically illustrate samples of an Ethernet signal at the input of adaptive slicer 68, and decision thresholds of slicer 68, in accordance with embodiments that are described herein. The horizontal axis in both figures denotes the sample number, and the vertical axis denotes the signal level at the input of slicer 68. The signal samples in the two figures were acquired from two different PHY devices of the same type during a Bulk Current Injection (BCI) test.

In the present example the received signal is a PAM4 signal having four modulation levels. The nominal signal levels for the four modulation levels are {−3, −1, 1, 3}. The samples of the received signal can be partitioned into four subsets, namely a subset 84A associated with modulation level "−3", a subset 84B associated with modulation level "−1", a subset 84C associated with modulation level "1", and a subset 84D associated with modulation level "3".

To demodulate this signal, slicer 68 compares the samples to three decision thresholds 88A, 88B and 88C. A sample that falls below threshold 88A is demodulated as "−3"; a sample that falls between thresholds 88A and 88B is demodulated as "−1"; a sample that falls between thresholds 88B and 88C is demodulated as "1"; and a sample that falls above threshold 88C is demodulated as "3".

In the present example, the samples of the received signal are distorted by EMI, and therefore their actual levels deviate from the nominal signal levels {−3, −1, 1, 3}. The samples of each subset (84A-84D) are distributed with some statistical distribution around the respective nominal signal levels (−3, −1, 1 and 3, respectively). The statistical distributions of the samples are also referred to herein as "noise distributions".

As can be seen in FIGS. 2A and 2B, the statistical distribution of the samples differs from one modulation level to another. In FIG. 2A, for example, the distribution of the samples in subset 84B is considerably narrower than the distribution of the samples in subset 84D. In other words, the samples associated with modulation level "3" are distorted more severely than the samples associated with modulation level "−1". Such differences in the level of distortion between modulation levels is characteristic of signal-dependent EMI.

The example of FIG. 2B also shows a characteristic scenario of samples distorted by signal-dependent EMI. In FIG. 2B, the distribution of the samples in subset 84C is narrower than the distribution of the samples in subset 84D, i.e., the samples associated with modulation level "3" are distorted more severely than the samples associated with modulation level "1".

A comparison between FIGS. 2A and 2B demonstrates that the noise distributions may vary from one PHY device to another, and that it is difficult to predict in advance which modulation levels will suffer greater distortion. The noise distributions may also vary over time in a given PHY device.

Since the noise distribution may differ from one modulation level to another and/or over time in an unpredictable manner, the optimal positions of the decision thresholds (thresholds 88A-88C in FIGS. 2A and 2B) vary in a similar manner. Optimal positioning of the decision thresholds has a considerable impact on the error performance, e.g., Bit Error Rate (BER) or Frame Error Rate (FER), of slicer 68 and of receiver 56 as a whole.

Consider, for example, threshold 88B, which is used for distinguishing between samples associated with level "−1" and samples associated with level "1". In FIG. 2A, the noise distributions of these two modulation levels (84B and 84C) are considerably different from one another. The optimal position of decision threshold 88B, therefore, is not precisely at the mid-point between "−1" and "1", but rather closer to "−1" (the modulation level having less distortion). Positioning the decision threshold at the optimal position (whether at the mid-point or otherwise) is important for maintaining a low error rate.

In FIG. 2B, however, the situation is different—The noise distributions of the two modulation levels in question (84B and 84C) are similar, with modulation level "−1" being only slightly more distorted than modulation level "1". As such, the optimal position of decision threshold 88B is closer to the mid-point between "−1" and "1" than as seen in the example of FIG. 2A.

The above non-limiting examples demonstrate the effectiveness of adapting the decision thresholds of slicer 68 relative to the signal, especially when demodulating signals distorted by signal-dependent EMI.

In various embodiments, EMI detector 76 may use various techniques for detecting EMI in general, and/or signal-dependent EMI, in the received signal. In an example embodiment, EMI detector 76 estimates the magnitude of the common-mode component of the received signal, e.g., by sensing the voltage or current on the two wires of cable 40. A strong common-mode component (e.g., having a magnitude that exceeds a predefined threshold) is typically indicative of EMI.

In another embodiment, EMI detector 76 stores an expected relationship between the BER of the received signal and the Signal-to-Noise Ratio (SNR). This expected relationship is valid in absence of EMI. In this embodiment, EMI detector 76 estimates the actual BER/SNR relationship in the received signal. If the actual BER/SNR relationship deviates significantly (e.g., by more than a predefined amount) from the expected EMI-free relationship, EMI detector 76 indicates that EMI is present.

In another embodiment, EMI detector 76 estimates noise metrics (e.g., noise variance or average noise power) for the various modulation levels. If two or more of the noise metrics differ from one another by more than a defined amount, EMI detector 76 indicates that signal-dependent EMI is present. In an example embodiment, EMI detector 76 may estimate the average noise power for each individual modulation level by calculating a moving average of the noise power using a suitable averaging window.

In an embodiment, EMI detector 76 may initially detect a sudden increase in the average noise power of one or more of the modulation levels. Such an increase may be indicative of EMI. Upon detecting such an event, EMI detector 76 may check whether the average noise power differs between two or more of the modulation levels. If so, EMI detector 76 may conclude that signal-dependent EMI is present. Further alternatively, EMI detector 76 may detect EMI in general, and/or signal-dependent EMI, in any other suitable way.

In various embodiments, slicer controller 80 uses various techniques and criteria for estimating the optimal positions of the decision thresholds. In some embodiments, controller 80 calculates the position of a decision threshold based on estimated noise metrics of the samples associated with the two modulation levels separated by the decision threshold. In an example embodiment, controller 80 sets the decision threshold to a value given by:

$$\text{Slicer\_Position} = \frac{\sigma_1}{\sigma_1 + \sigma_2}\left[\mu_2 + \frac{\sigma_2}{\sigma_1}\mu_1\right]$$

wherein $\mu_1$, and $\mu_2$ denote the nominal signal levels of the two modulation levels separated by the decision threshold, and $\sigma_1$ and $\sigma_2$ denote the standard deviations of the noise distributions of the two modulation levels.

For Gaussian noise distributions this setting is optimal, but the same calculation provides good results for other distributions as well. In this example the noise metrics are standard deviations of the noise distributions. In other embodiments, any other suitable noise metrics (e.g., noise power, or variance) can be used.

In other embodiments, slicer controller 80 adjusts one or more of the decision thresholds iteratively, using a criterion that aims to reduce the error rate, e.g., Bit Error Rate (BER) or Frame Error Rate (FER), at the output of slicer 68. In an alternative embodiment, the criterion aims to reduce the rate of uncorrectable errors at the output of FEC decoder 72 (i.e., the rate of remaining errors after FEC decoding). In another embodiment, the criterion aims to reduce the rate of correctable errors at the output of FEC decoder 72 (i.e., the rate of errors corrected by the FEC decoding).

In order to evaluate such criteria, slicer controller 80 receives inputs such as (i) an error signal from slicer 68, (ii) the demodulated data from slicer 68, and (iii) indications of remaining errors from FEC decoder 72. Suitable combinations of the above criteria, as well as any other suitable criteria, can also be used.

Figure 3:
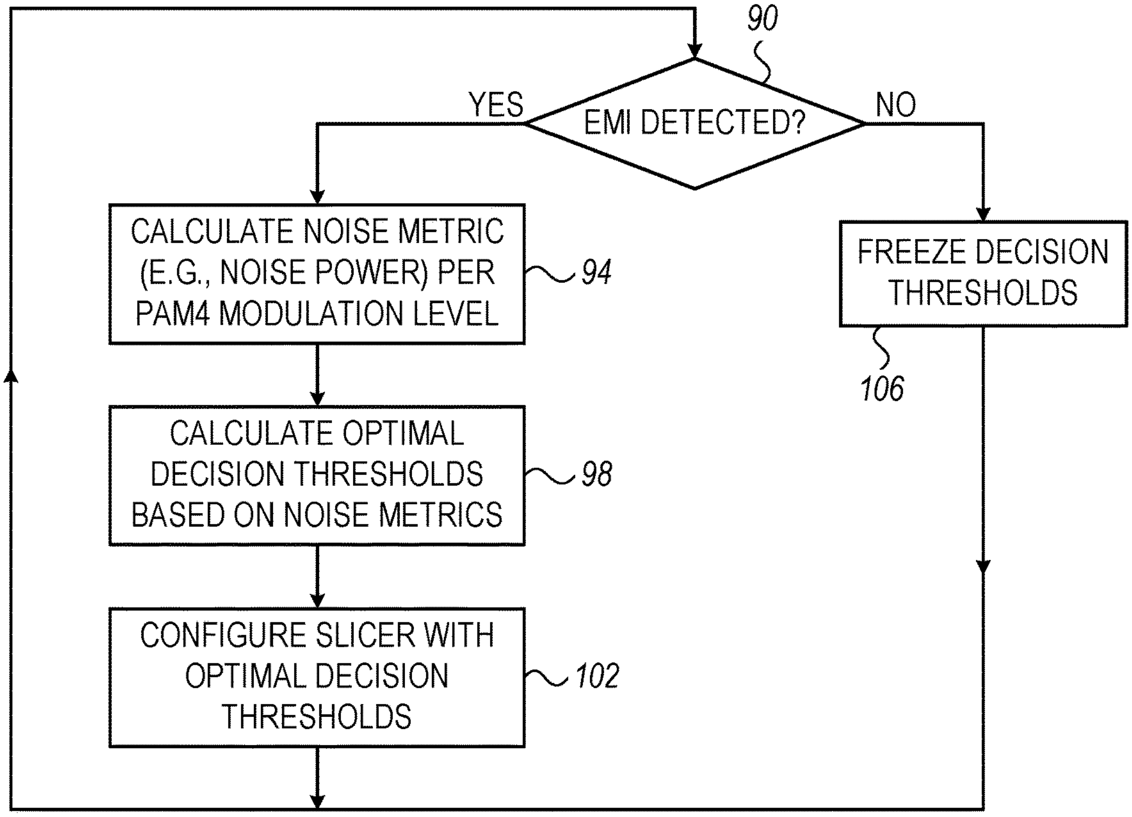
FIGS. 3 and 4 are flow charts that schematically illustrate methods for EMI suppression using an adaptive slicer, in accordance with embodiments that are described herein.
Figure 4:
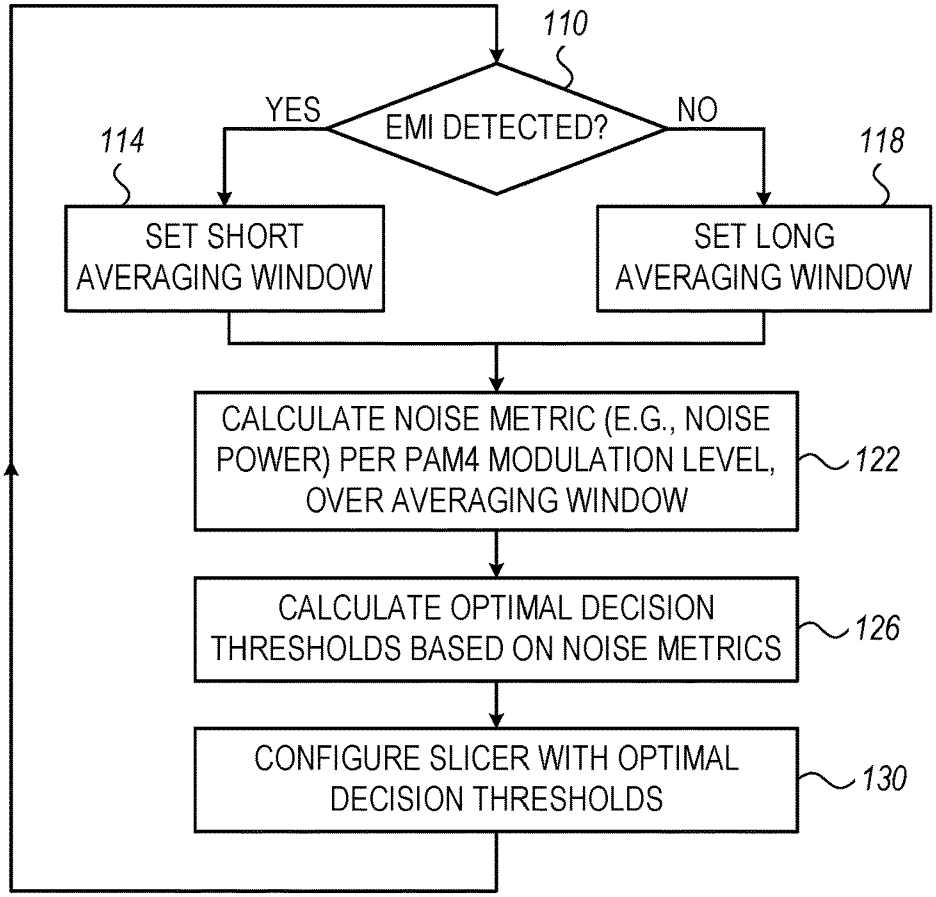

FIGS. 3 and 4 are flow charts that schematically illustrate example methods for EMI suppression using adaptive slicer 68, in accordance with embodiments that are described herein. In the method of FIG. 3, slicer controller 80 adapts the decision thresholds of slicer 68 when signal-dependent EMI is present, and freezes the adaptation otherwise. In the method of FIG. 4, slicer controller 80 adapts the decision thresholds continuously, but uses a shorter averaging window when signal-dependent EMI is present.

The method of FIG. 3 begins with slicer controller 80 checking (based on input from EMI detector 76) whether or not signal-dependent EMI is present, at a checking operation 90.

If signal-dependent EMI is detected, slicer controller 80 calculates a respective noise metric for each of the PAM4 modulation levels, at a metric calculation operation 94. At a threshold calculation operation 98, slicer controller 80 calculates the optimal positions of the three decision thresholds of slicer 68, based on the noise metrics. At a threshold setting operation 102, slicer controller 80 configures slicer 68 with the calculated decision thresholds. The method then loops back to stage 90 above.

If, on the other hand, checking operation 90 indicates that signal-dependent EMI is not present, slicer controller 80 freezes the decision thresholds of slicer 68 at their current values, at a freezing operation 106. The method loops back to stage 90 above.

The method of FIG. 4 begins with slicer controller 80 checking (based on input from EMI detector 76) whether or not signal-dependent EMI is present, at a checking operation 110.

If signal-dependent EMI is detected, slicer controller 80 sets a short averaging window for averaging noise metrics, at a short window setting operation 114. If signal-dependent EMI is not detected, slicer controller 80 sets a long averaging window for averaging noise metrics, at a long window setting operation 118. Any suitable window sizes can be used, provided that the long averaging window set at operation 118 is longer than the short averaging window set at operation 114.

At a metric calculation operation 122, slicer controller 80 calculates a respective noise metric for each of the PAM4 modulation levels, and averages each noise metric over the averaging window size set at stage 114 or 118. At a threshold calculation operation 126, slicer controller 80 calculates the optimal positions of the three decision thresholds of slicer 68, based on the noise metrics. At a threshold setting operation 130, slicer controller 80 configures slicer 68 with the calculated decision thresholds. The method then loops back to stage 110 above.

In some embodiments, EMI detector 76 may switch between a short averaging window and a long averaging window as needed. A short averaging window enables fast response, whereas a long averaging window provides a more accurate measurement. In an example embodiment, upon detecting a deterioration in signal quality (e.g., an increase in the rate of correctable and/or uncorrectable errors), EMI detector 76 or controller 80 may switch to a short averaging window in order to assess the cause for the deterioration and decide on a suitable action.

Although the embodiments described herein mainly address Ethernet communication systems, the methods and systems described herein can also be used in other applications, such as in power line communication, cable modems, digital subscriber lines or serial I/O communications systems.

It is noted that the embodiments described above are cited by way of example, and that the present invention is not limited to what has been particularly shown and described hereinabove. Rather, the scope of the present invention includes both combinations and sub-combinations of the various features described hereinabove, as well as variations and modifications thereof which would occur to persons skilled in the art upon reading the foregoing description and which are not disclosed in the prior art. Documents incorporated by reference in the present patent application are to be considered an integral part of the application except that to the extent any terms are defined in these incorporated documents in a manner that conflicts with the definitions made explicitly or implicitly in the present specification, only the definitions in the present specification should be considered.

The invention claimed is:

1. An Ethernet Physical Layer (PHY) device for use in an Ethernet communication system, the Ethernet PHY device comprising:

a receiver configured to receive an Ethernet signal from a physical Ethernet link, the receiver comprising a slicer configured to convert the received signal into a sequence of demodulated symbols by comparing samples of the signal to one or more decision thresholds;

an Electromagnetic Interference (EMI) detector, configured to detect EMI that distorts the received signal; and a slicer controller, configured to adjust at least a decision threshold among the one or more decision thresholds of the slicer, relative to the samples of the signal, responsively to the detected EMI, wherein the slicer controller is configured to adjust the decision threshold by setting a position of the decision threshold based on the detected EMI.

2. The Ethernet PHY device according to claim 1, wherein the slicer controller is configured to adjust the decision thresholds relative to the samples of the signal by performing one or both of:

moving the decision threshold; and moving amplitudes of at least some of the samples of the signal.

3. The Ethernet PHY device according to claim 1, wherein the EMI detector is configured to detect the EMI by detecting signal-dependent EMI that causes a noise distribution of the received signal to have:

a first variance when calculated over a first subset of the samples associated with a first modulation level; and a second variance, different from the first variance, calculated over a second subset of the samples associated with a second modulation level, different from the first modulation level.

4. The Ethernet PHY device according to claim 1, wherein the EMI detector is configured to detect the EMI by detecting a common-mode component of the received signal.

5. The Ethernet PHY device according to claim 1, wherein the EMI detector is configured to detect the EMI by detecting a deviation from an expected relationship between error rate and Signal-to-Noise Ratio (SNR) in the received signal.

6. The Ethernet PHY device according to claim 1, wherein the slicer controller is configured to adjust the decision threshold using a criterion that aims to reduce an error rate in the sequence of demodulated symbols.

7. The Ethernet PHY device according to claim 1, wherein the received signal carries data encoded with a Forward Error Correction (FEC) code, wherein the Ethernet PHY device further comprises a FEC decoder configured to decode the FEC code, and wherein the slicer controller is configured to adjust the decision threshold using a criterion that aims to reduce, at an output of the FEC decoder, at least a rate of errors that are correctable.

8. The Ethernet PHY device according to claim 1, wherein the received signal carries data encoded with a Forward Error Correction (FEC) code, wherein the Ethernet PHY device further comprises a FEC decoder configured to decode the FEC code, and wherein the slicer controller is configured to adjust the decision threshold using a criterion that aims to reduce, at an output of the FEC decoder, at least a rate of errors that are uncorrectable.

9. The Ethernet PHY device according to claim 1, wherein the slicer controller is configured to estimate first and second noise metrics over respective first and second subsets of the samples associated with respective first and second modulation levels of the received signal, and to adjust the decision threshold based on the first and second noise metrics.

10. The Ethernet PHY device according to claim 9, wherein the slicer controller is configured to:

average the first and second noise metrics over a first averaging window when the EMI is not detected; and when the EMI is detected, average the first and second noise metrics over a second averaging window, shorter than the first averaging window.

11. The Ethernet PHY device according to claim 1, wherein the slicer controller is configured to permit adaptation of the decision threshold when the EMI is detected, and to freeze the decision threshold when the EMI is not detected.

12. A method in an Ethernet Physical Layer (PHY) device of an Ethernet communication system, the method comprising:

receiving an Ethernet signal from a physical Ethernet link;

converting the received signal into a sequence of demodulated symbols by comparing samples of the signal to one or more decision thresholds;

detecting Electromagnetic Interference (EMI) that distorts the received signal; and adjusting at least a decision threshold among the one or more decision thresholds, relative to the samples of the signal, responsively to the detected EMI, wherein adjusting the decision threshold includes setting a position of the decision threshold based on the detected EMI.

13. The method according to claim 12, wherein adjusting the decision thresholds relative to the samples of the signal comprises one or both of:

moving the decision threshold; and moving amplitudes of at least some of the samples of the signal.

14. The method according to claim 12, wherein detecting the EMI comprises detecting signal-dependent EMI that causes a noise distribution of the received signal to have:

a first variance when calculated over a first subset of the samples associated with a first modulation level; and a second variance, different from the first variance, calculated over a second subset of the samples associated with a second modulation level, different from the first modulation level.

15. The method according to claim 12, wherein detecting the EMI comprises detecting a common-mode component of the received signal.

16. The method according to claim 12, wherein detecting the EMI comprises detecting a deviation from an expected relationship between error rate and Signal-to-Noise Ratio (SNR) in the received signal.

17. The method according to claim 12, wherein adjusting the decision threshold comprises applying a criterion that aims to reduce an error rate in the sequence of demodulated symbols.

18. The method according to claim 12, wherein the received signal carries data encoded with a Forward Error Correction (FEC) code, wherein the Ethernet PHY device includes a FEC decoder for decoding the FEC code, and wherein adjusting the decision threshold comprises applying a criterion that aims to reduce, at an output of the FEC decoder, at least a rate of errors that are correctable.

19. The method according to claim 12, wherein the received signal carries data encoded with a Forward Error Correction (FEC) code, wherein the Ethernet PHY device includes a FEC decoder for decoding the FEC code, and wherein adjusting the decision threshold comprises applying a criterion that aims to reduce, at an output of the FEC decoder, at least a rate of errors that are uncorrectable.

20. The method according to claim 12, wherein adjusting the decision threshold comprises estimating first and second noise metrics over respective first and second subsets of the samples associated with respective first and second modulation levels of the received signal, and adjusting the decision threshold based on the first and second noise metrics.

21. The method according to claim 20, further comprising:

averaging the first and second noise metrics over a first averaging window when the EMI is not detected; and when the EMI is detected, averaging the first and second noise metrics over a second averaging window, shorter than the first averaging window.

22. The method according to claim 12, further comprising permitting adaptation of the decision threshold when the EMI is detected, and freezing the decision threshold when the EMI is not detected.

23. An Ethernet Physical Layer (PHY) device for use in an Ethernet communication system, the Ethernet PHY device comprising:

a receiver configured to receive an Ethernet signal from a physical Ethernet link, the receiver comprising a slicer configured to convert the received signal into a sequence of demodulated symbols by comparing samples of the signal to one or more decision thresholds;

an Electromagnetic Interference (EMI) detector, configured to detect EMI that distorts the received signal; and a slicer controller, configured to adjust at least a decision threshold among the one or more decision thresholds of the slicer, relative to the samples of the signal, responsively to the detected EMI, wherein the slicer controller determines and sets a position of the decision threshold based on the detected EMI.

* * * * *